DISPENSING DEVICE FOR STRIP MATERIAL

Original Filed July 2, 1953 3 Sheets-Sheet 1

DISPENSING DEVICE FOR STRIP MATERIAL

Original Filed July 2, 1953 3 Sheets-Sheet 2

DISPENSING DEVICE FOR STRIP MATERIAL

Original Filed July 2, 1953 3 Sheets-Sheet 3

United States Patent Office

Re. 24,778
Reissued Feb. 9, 1960

24,778

DISPENSING DEVICE FOR STRIP MATERIAL

Johannes Ditzel, Kilianstadten, Germany

Original No. 2,789,818, dated April 23, 1957, Serial No. 365,738, July 2, 1953. Application for reissue June 4, 1958, Serial No. 739,958

Claims priority, application Germany October 27, 1952

12 Claims. (Cl. 271—2.4)

Matter enclosed in heavy brackets [ ] appears in the original patent but forms no part of this reissue specification; matter printed in italics indicates the additions made by reissue.

For dispensing strips *of tape* adapted to be pulled from a supply roll, in particular adhesive strips for packing purposes, devices have been developed which are adjustable within limits to any desired delivery lengths. In the known constructions of devices of this type, however, when the adjustment has been made either only the same length can be delivered in the successive operations, or two or more different lengths can be delivered in a predetermined sequence. This is due to the fact that with these devices the control disc by which the length to be delivered is determined, although rotating intermittently, always rotates in the same direction, so that after each revolution the control cycle set thereon is repeated. If, for example, one longer strip and one shorter strip are required to seal a box, the known devices can be adjusted to deliver these two strips alternately, but, for example, after having delivered one shorter strip they cannot deliver a further shorter strip when required.

The invention concerns a new design of a dispensing device for strips adapted to be pulled from a supply roll, especially for adhesive strips for packing purposes, comprising means for the pre-adjustment of the lengths to be delivered at each operation, by means of which it is possible to produce the desired alternation in the pre-adjusted lengths, so that when the device is pre-adjusted to dispense two different lengths, the longer or the shorter strip is delivered in any desired sequence.

[In accordance with the invention, this object is achieved owing to the fact that in a device for dispensing strips to be pulled from a supply roll, in particular adhesive strips for packing purposes, with pre-adjustment of the length to be delivered in each operation by means of a feed roller, adapted to be intermittently driven, for the strip, a pressing roller mounted on a rocking member, and carrying the severing blade on the counter-arm, and a control disc driven with the feed roller and comprising disengaging members associated with the rocking member, the control disc is constructed as a return disc adapted to be driven against spring action by the drive, the disengaging members are adjustably arranged in different paths on the control disc, and the counter-element of the rocking member is adapted to be changed over to the paths of the various disengaging members.] *In accordance with the invention, this object is achieved in a device having a supply roll for the adhesive strip from which roll strips, and in particular strips for packing purposes, are drawn, severed and dispensed, with pre-adjustment of the length to be delivered at each operation. For this purpose a feed roller is provided to intermittently draw the strip from the supply roll, and a pressing roll, corresponding with the feed roller, is mounted on a rocking member which also carries the severing blade on a counter arm. A rotatably controlled disk, provided with a spring return, is driven from the shaft of the feed roller, upon which disk disengaging*

*members are adjustably arranged in different planes to disengage the pressing roller from the feed roller and interrupt the feed.* Preferably, the disengaging members are arranged in juxtaposition on the periphery of the control disc, while a number of switch members tripping the drive, corresponding to the number of disengaging members, are provided which change-over the counter-element on the rocking member to the disengaging member corresponding to the key in question.

By means of this design, the result is achieved that when the additional key is depressed the feed drive for the strip is engaged for the duration of the depression, the automatic disconnecting device being disengaged, and when this key is released the feed is stopped and the strip which has been conveyed until this instant is cut off.

For a better understanding of the invention and to show how it may be carried into effect, the same will now be described, by way of example, with reference to the accompanying drawings, in which.

Figure 1:
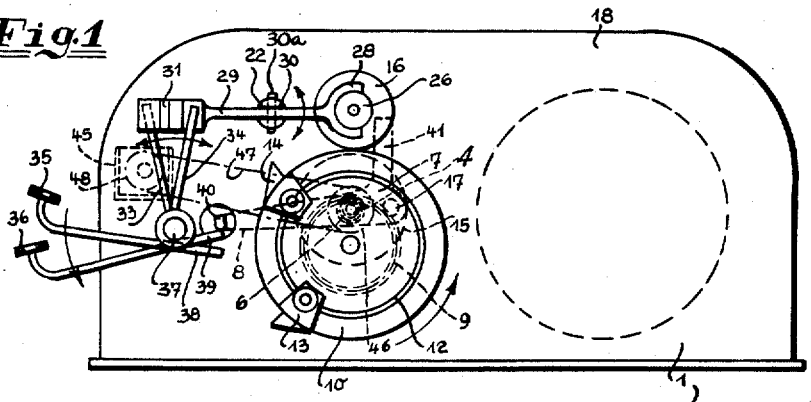
Figure 1 is a side elevation of the device.
Figure 2:
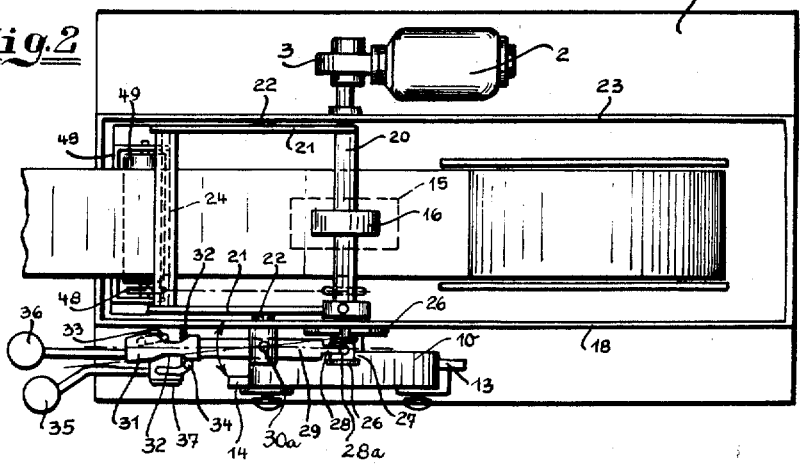
Figure 2 is a plan view.
Figure 3:
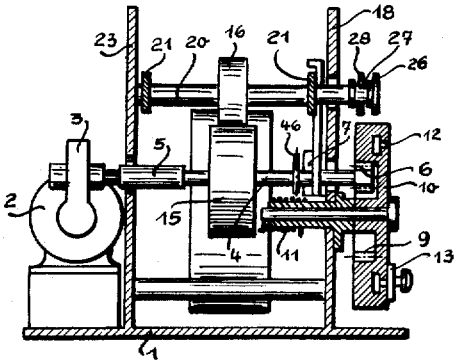
Figure 3 is a section through the conveyor drive.
Figure 4:
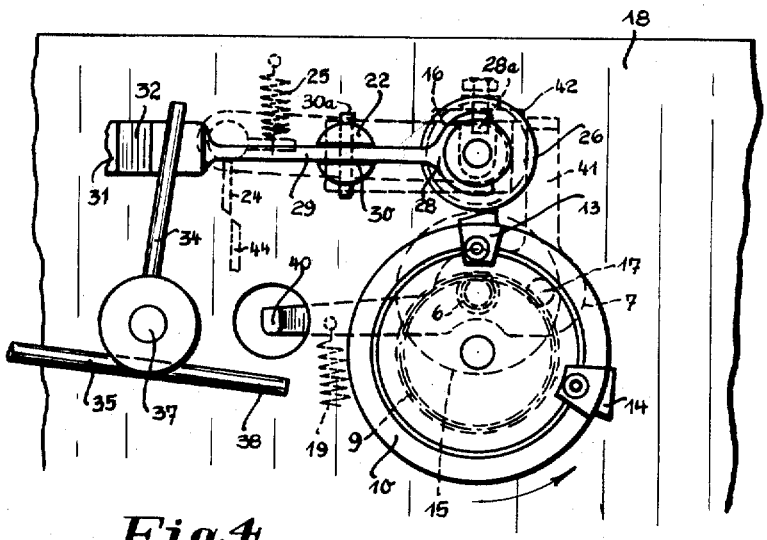
Figure 4 shows the switching arrangement on a larger scale.
Figure 5:
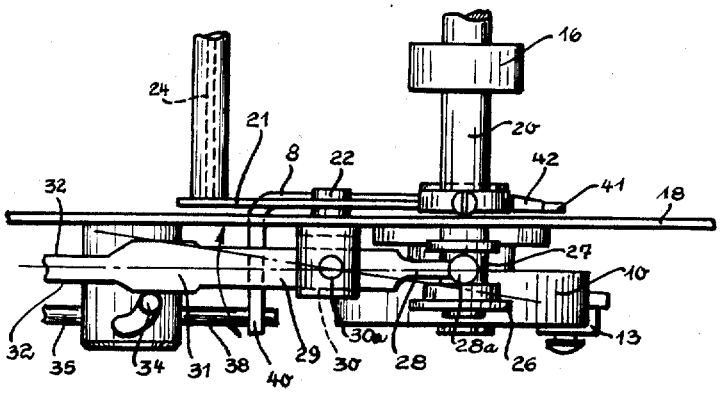
Figure 5 is a plan view of the change-over arrangement.
Figure 6:
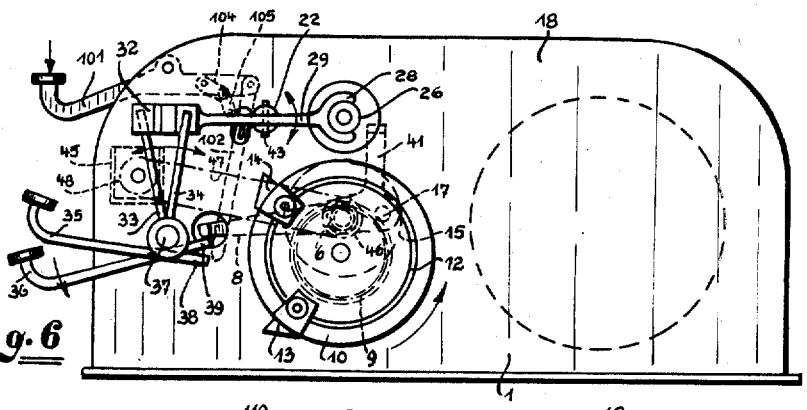
Figure 6 is a side elevation of a device with the third key.
Figure 7:
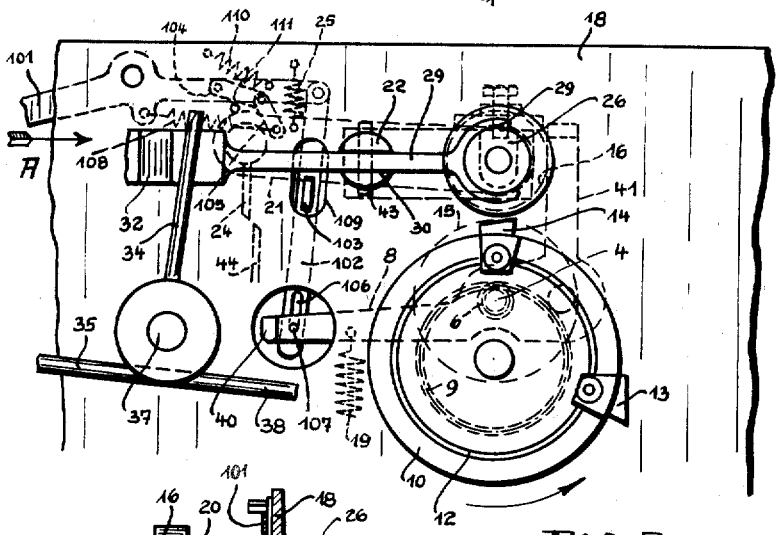
Figure 7 shows on a larger scale the switching arrangement influenced by the said key.
Figure 8:
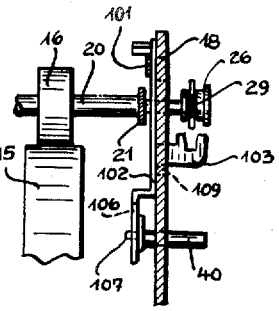
Figure 8 is a view in the direction of the arrow A of Figure 7.

The constructional example is a dispensing device with power drive, which can be connected to the feed drive for each operation by a switching arrangement.

The frame 1 of the device supports an electric motor 2 which drives through a gearing 3 a shaft 4 which is coupled through a universal joint 5 with the gearing 3 and supports on its opposite end a pinion 6. Near to the pinion 6, the shaft 4 is held by a bearing bracket 7 of a lever 8, which is pivotally mounted on a pin 17 on the cheek 18 of the frame 1. Associated with the pinion 6 is the inner annulus 9 of a control disc 10 which is mounted for rotation against the action of a return spring 11 on the cheek 18. The control disc 10 in the constructional example supports in an annular groove 12 two stops 13, 14 which are guided at different depths over the surrounding surface of the disc 10. However, each of these control stops may be displaceable in a separate annular groove in the disc 10.

The shaft 4 supports a feed roller 15 for the adhesive strip, with which a counter-roller 16 is associated. The lever 8 is loaded by a spring 19 which so influences it that the pinion 6 constantly driven by the motor 2 is not in engagement with the toothed annulus 9.

The counter-roller 16 is mounted with its supporting spindle 20 on a rocking member 21, which is pivotally mounted by means of the pin 22 on the cheeks 18, 23 and supports at the opposite end the severing blade 24, with which a counter-blade 44 is associated. The rocking member 21 is urged clockwise about pin 22 by a spring 25 to urge the counter-roller 16 into contact with the feed roller 15. The end of the supporting spindle 20 of the counter-roller 16 is extended beyond the cheek 18, at which end a control roller 26 is slidably mounted thereon. The roller 26 has a recess 27 in which a projection 28a on a fork 28 of an adjustment lever 29 is guided. The adjustment lever 29 is swingably guided about an axle 30a in a slot 30 in pin 22 and terminates in a control lug 31. The latter has in both sides thereof recesses 32 in which the upwardly bent arms 33, 34 of two operating keys 35, 36 engage. The operating keys 35, 36 are pivotally mounted on a pin 37 and each comprise a finger 38, 39 engaging below a bent-over end portion 40 of the lever 8.

The lever 8 is provided with an upwardly bent abutment 41 with which a lug 42 on rocking member 21 is associated.

The shaft 4 also supports a pinion 46, which is coupled through a chain 47 with the driving pinion 48 of the moistening cylinder 49, which dips into a water-filled trough 45. Due to the fact that the cylinder 49 is driven by the shaft 4, the result is obtained that the cylinder 49 is set in rotation when the driving motor 2 is switched on. The drive of the moistening cylinder 49 is consequently independent of the forward feed drive for the adhesive strip, which is only coupled by the depression of one of the two keys 35, 36. The adhesive strip fed forward after the depression of one of the keys 35, 36 consequently encounters the cylinder 49 moistened over its entire surface by its rotation in the water in the trough 45, and is consequently also moistened from its very beginning as it slides over the cylinder 49.

In order to set the device in operation, the two stops 13, 14 are adjusted to the two lengths to be severed. By depression of one of the two keys 35, 36 the lever 8 is lifted by the finger 38 or 39 against the action of the spring 19, so that the pinion 6 engages with the toothed annulus 9 and drives the control disc 10. When the lever 8 is lifted, the stop 41, on which the projection 42 lies in the initial position, is also swung out and releases the projection 42, so that the rocking member 21 is released for applying the counter-roller 16 against the conveyor roller 15. Moreover, on depression of one of the keys 35, 36 the adjustment lever 29 has been so swung out by the arm 33, 34 of the key in question that the control roller 26 lies in the path of one or other of the stops 13, 14 where it remains until the adjustment lever 29 is swung out once more by actuation of one of the keys 35, 36.

On release of the depressed key 35, 36 the lever 8 tends to return into the initial position, but the stop 41 thereof thus bears against the projection 42 of the rocking member. The lever consequently remains in the driving position until, by the impact of one or other of the stops 13, 14 against the control roller 26, the latter is lifted with the adjusting lever 29 and the rocking member 21. The projection 42 thus releases the stop 41, and the lever 8 returns into the initial position. The pinion 6 is disengaged from the toothed annulus 9, so that the disc 10 returns under the action of the spring 11 into the initial position. This initial position is determined by an end stop (not shown) for the disc 10.

With the lifting of the rocking member 21, the counter-roller 16 has also been lifted from the feed roller 15 and the blade 24 has been pressed down to effect the cutting. With the release of the control roller 26 by the stop 13 or 14 returning with the disc 10, the rocking member 21 also tends to return into the initial position under the action of the spring 25. The projection 42 thus encounters the stop 41, so that the perimeter of the counter-roller 16 is held at a short distance from the perimeter of the returning feed roller. Consequently, the end of the strip is not pushed back when the feed roller 15 is returned by a return motion of the shaft 4 caused by an engagement of the pinion 6 with the toothed annulus 9 during the return of the control disc 10.

Thus, depending upon which of the keys 35 and 36 is depressed, two strips of different lengths are alternately fed, while any desired number of longer or shorter strips can be successively removed.

In order that sections of any desired length which have not been pre-set may also be removed from the device with this drive construction, there is provided in association with the lever 8 a draw rod 102 which is operable by means of a key lever 101 mounted on the side cheek 18. The draw rod 102 has formed therein a slot 106 in which a pin 107 of the lever 8 engages. The lever 8 can consequently be operated according to choice by depression of one of the keys 35, 36 or 101.

The key lever 101 is coupled with one arm 21 of the rocking member by a pair of toggle levers 104, 105 which are so arranged that they are brought into the extended position by depression of the key 101 and under the action of a spring 108 engaging between the key lever 101 and the arm 105.

The draw rod 102 supports a cam 103 extending through a recess 109 in the side cheek 18, which cam lies, when the draw rod 102 is in its initial position, under the control lever 29, but rocks the latter outwardly when lifted and thus brings it into a central position in which it brings the roller 26 into an inoperative lateral position outside the two stops 13, 14.

Thus, on depression of the key lever 101 the drive 4, 6 is coupled for the duration of the depression and the rocking member is released so as to apply the pressing roller 16 against the feed roller 15. Consequently, the strip is fed forward until the key lever 101 is released again. On release of the key lever 101, which is under the action of the return spring 108, the rocking member returns into the initial position. The rocking member is thus rocked in the counter-clockwise direction by the pair of toggle levers 104, 105, situated in the extended position, so that the pressing roller 16 is lifted from the feed roller 15 and the blade 24 is lowered against the counter-surface.

Associated with the pair of toggle levers 104, 105 on the side cheek 18 is an abutment 111, which, shortly before the key lever 101 reaches the initial position, inwardly hinges the pair of toggle levers 104, 105 and consequently permits the rocking member to return into the initial position.

Thus it is seen that the lever 8 is coupled with the draw rod 102 by the slot 106 and the pin 107 engaging the same. In consequence thereof, the lever 8 may be swung out by actuating the key levers 35, 36 independently of the position of the draw rod 102.

The draw rod 102 is coupled with the key 101 so as to lift by a depression of the key lever 101 the draw rod 102 which causes a swinging motion of the lever 8.

Furthermore, the key lever 101 is coupled with the arm 21 of the rocking member by a pair of toggle levers 104, 105. By depressing the key lever 101 the toggle lever 104, 105 is brought into the extended position thereof by the spring 108 engaging the arm 105.

Thus the following effects are obtained:

When the key lever 101 is depressed, the pinion 6 is brought to engagement with the inner toothed annulus 9 by the draw rod 102 engaging the pin 107 attached to the lever 8. In consequence thereof the feed of the strip is started.

Simultaneously therewith by the stretching of the toggle lever 104, 105 the arm 21 of the rocking member is swung so as to cause the counter-roller 16 to engage the feed roller 15, this position being secured by the return spring 108. Only when the key lever 101 is released, the pinion 6 is [lifted] *moved* out of engagement with the inner toothed annulus 9, thus making an end to the feed of the strip. The toggle lever 104, 105 is brought out of the extended position thereof, so that the arm 21 is swung into the other end position thereof, thus enabling the knife to carry out the severing cut, the counter-roller 16 being lifted from the feed roller.

It is thus possible by means of this new additional arrangement to remove from the device, apart from the pre-set lengths, any length of strip, judged by the eye, by depression of the further key, this length depending only upon the period for which the said further key is depressed.

I claim:

1. In a device for dispensing strips: a feed roller, a rocking member, and a pressing roller mounted on said rocking member, a control disc adapted for being coupled to said feed roller, driving means for driving said feed roller and adapted to be coupled in driving engagement to said control disc at certain portions of the operating cycle, a spring means connected to said control disc for returning the same to the initial position thereof when the same has been driven by said driving means, manually operable control means for coupling said drive means to said control disc and rocking said rocking member to urge said pressing roller against said feed roller, disengaging members mounted on said control disc and positioned to actuate said rocking member to thereby urge said pressing roller away from said feed roller, said disengaging members being adjustably secured respectively in different positions on opposite sides of a plane of said control disc, and a control roller supported by said rocking member for engaging said disengaging members, said control means shifting said control roller selectively to a side of said control disc plane corresponding to one of said different positions of said disengaging members while rocking said rocking member, the actuation of said rocking member by said disengaging member disengaging said drive means from said control disc.

2. In a device as claimed in claim 1, said control disc having an annular groove on one side face thereof, said disengaging members being disposed in said annular groove and securable in different positions, and cam surfaces, forming part, respectively, of said disengaging members for engagement with said control roller.

3. In a device as claimed in claim 2, an adjustment lever supported by said rocking member so as to be rockable in a plane, said adjustment lever having one end forked to receive said control roller, control surfaces provided at the other end of said adjustment lever for shifting the same, and key levers engaging said control surfaces for shifting said adjustment lever.

4. In a device as claimed in claim 1, key levers, a constantly driven power device, a toothed annulus forming part of said control disc, a pinion coupled with said power device and adapted to engage said toothed annulus, said driving means of said control disc including a driving shaft supporting said pinion, and a rocking lever carrying said driving shaft supporting said pinion, said rocking lever being lifted by said key levers for engagement of said pinion with said toothed annulus.

5. In a device as claimed in claim 4, said feed roller being arranged on said driving shaft supporting said pinion.

*6. A tape-dispensing mechanism comprising a frame, a shaft rotatably mounted on said frame having a feed roller thereon, means for rotating said shaft, a pressing roller, a spindle upon which said pressing roller is mounted, said spindle being mounted for movement of said pressing roller toward and from said feed roller, a control disc rotatably mounted on said frame, means for coupling said feed roller shaft to said disc to rotate the latter, manually operable means for simultaneously effecting said coupling and moving said pressing roller toward said feed roller, cam means on said control disc, control means on said spindle with which said cam means engages to move said pressing roller out of engagement with said feed roller and simultaneously uncouple said feed roller shaft from said disc, and spring means to return said disc to its original position.*

*7. A tape-dispensing mechanism as in claim 6 wherein a plurality of said cam means are provided on said disc, and said control means is movable axially on said spindle on which it is mounted to engage a selected one of said cam means.*

*8. A tape-dispensing mechanism as in claim 6 wherein a plurality of said cam means are provided on said disc, said control means is movable axially on said spindle on which it is mounted to engage a selected one of said cam means, and said cam means being shiftable to various positions on said disc to vary the length of tape delivered.*

*9. A tape-dispensing mechanism as in claim 6 wherein a plurality of said cam means are provided on said disc, said control means is movable axially on said spindle on which it is mounted to engage a selected one of said cam means, and said manually operable means being connected to said control means to move it along said spindle.*

*10. A tape-dispensing mechanism comprising a frame, a feed roller mounted on the frame, a rocking member, a pressing roller mounted on said rocking member adjacent said feed roller to cooperate therewith to feed a strip of tape therebetween, a control disc, driving means for said feed roller adapted to be coupled to said control disc to actuate the latter at certain portions of the operating cycle, spring means to return said control disc to initial position after actuation by said driving means, manually operable control means for coupling said driving means to said control disc and simultaneously urging said pressing roller toward said feed roller, disengaging members mounted on said control disc, a control member movably mounted on said rocking member for movement to position to be engaged by said disengaging members to move said rocking member and move said pressing roller carried thereby away from said feed roller, means simultaneously disengaging said driving means from said control disc, and said driving means comprising a shaft rotatably mounted in said frame and adapted for movement in a direction transverse to its axis to be engaged with said control disc.*

*11. A tape-dispensing mechanism comprising a frame, a feed roller rotatably mounted thereon, means for driving said roller, a rocking member rotatably mounted on said frame, a pressing roller carried by said rocking member and adapted to cooperate with said feed roller to feed a strip of tape, means urging said pressing roller into engagement with said feed roller, means for latching said presser roller out of engagement with said feed roller, a control disk, manually operable means for simultaneously coupling said control disk to said driving means for rotation of said disk and releasing said latching means to permit engagement of said rollers, a control member also carried by said rocking member, means on said control disk to engage said control member and move said pressing roller out of contact with said feed roller upon a predetermined movement of said control disk to discontinue feeding of the tape and uncoupling said control disk from said driving means, and means to return said control disk to its original position.*

*12. A tape-dispensing mechanism as in claim 11 wherein spring means is provided to return said control disk to its original position.*

References Cited in the file of this patent or the original patent

UNITED STATES PATENTS

| | | |
|---|---|---|
| Re. 20,180 | Gautier et al. | Nov. 24, 1936 |
| 1,652,715 | Hanscom | Dec. 13, 1927 |
| 1,732,635 | Chabot | Oct. 22, 1929 |
| 1,960,945 | Krueger | May 29, 1934 |
| 1,981,229 | Gillet | Nov. 20, 1934 |
| 2,133,868 | Morton | Oct. 18, 1938 |
| 2,408,363 | Beckman et al. | Oct. 1, 1946 |
| 2,616,689 | Baumgartner | Nov. 4, 1952 |